United States Patent [19]

Fraige

[11] 4,221,625

[45] Sep. 9, 1980

[54] WATER MATTRESS AND METHOD OF MANUFACTURE

[76] Inventor: Richard Fraige, 1823 Alameda Ave., Alameda, Calif. 94501

[21] Appl. No.: 676,834

[22] Filed: Apr. 14, 1976

Related U.S. Application Data

[62] Division of Ser. No. 566,858, Apr. 10, 1975, Pat. No. 3,957,557.

[51] Int. Cl.² ............................................. B32B 31/18
[52] U.S. Cl. ........................................ 156/251; 5/451; 150/9; 156/250; 156/513; 156/514
[58] Field of Search ............... 156/120, 160, 250, 251, 156/297, 306, 510, 513, 514; 150/9; 5/365–371, 449–458

[56] References Cited

U.S. PATENT DOCUMENTS

| | | | |
|---|---|---|---|
| 3,069,303 | 12/1962 | Scholle | 156/120 |
| 3,244,576 | 4/1966 | Swartz | 156/513 |
| 3,388,026 | 6/1968 | Campbell | 156/513 |
| 3,434,908 | 3/1969 | MacDonald | 156/514 |
| 3,753,823 | 8/1973 | Kuss | 156/272 |
| 3,957,557 | 5/1976 | Fraige | 156/211 |

*Primary Examiner*—John E. Kittle

*Attorney, Agent, or Firm*—Joseph L. Strabala

[57] ABSTRACT

An improved water mattress can be fabricated by a method which involves folding a rectangular sheet of thermal plastic material into a smaller rectangular sheet to form a dual-layered sandwich having three open edges; thereafter lap-sealing these three open raw edges to form a flat closed envelope, open at its corners; subsequently cutting specific sized rectangular notches in each corner of the envelope whereby the several apexes of each notch can be separated to form an overlapping slit which is reinforced with a separate piece of vinyl that is integrally bonded with the laps of the slit while it is in its stretched condition to completely seal the mattress. More specifically, sealing the open corners, after they are notched, is accomplished by stretching them over a small elongated oval die sufficient to cause the edges of the resulting slit to overlap slightly whereby an elongated reinforcing piece of vinyl can be lapped therewith and can be thermally welded with these overlapping edges to form a reinforced corner seam when all laps are welded simultaneously. After the last corner is properly sealed, the small, oval-shaped or elongated die can be removed through a plastic valve incorporated in one of the surfaces which is used to fill the resulting parallelepiped envelope forming the mattress.

2 Claims, 15 Drawing Figures

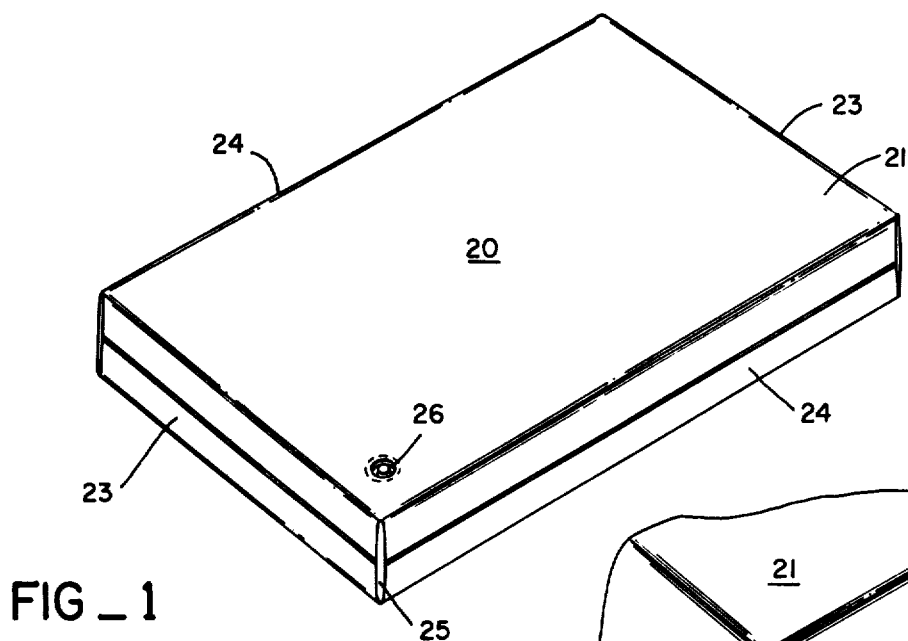
FIG_1
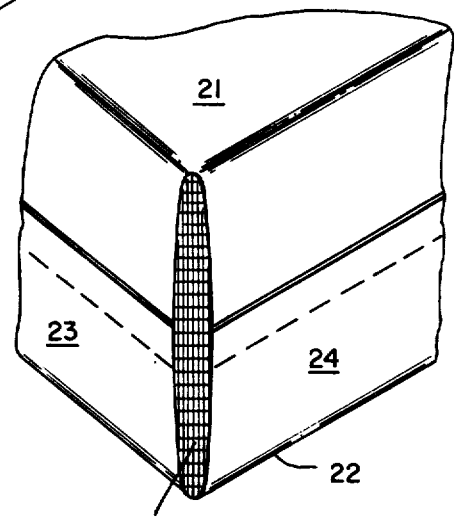
FIG_2
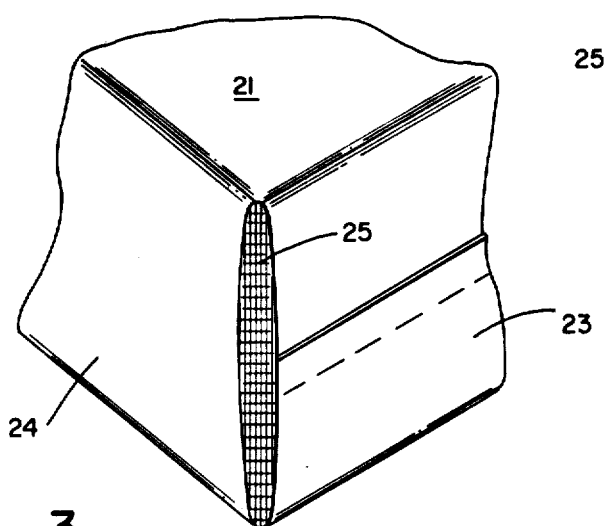
FIG_3

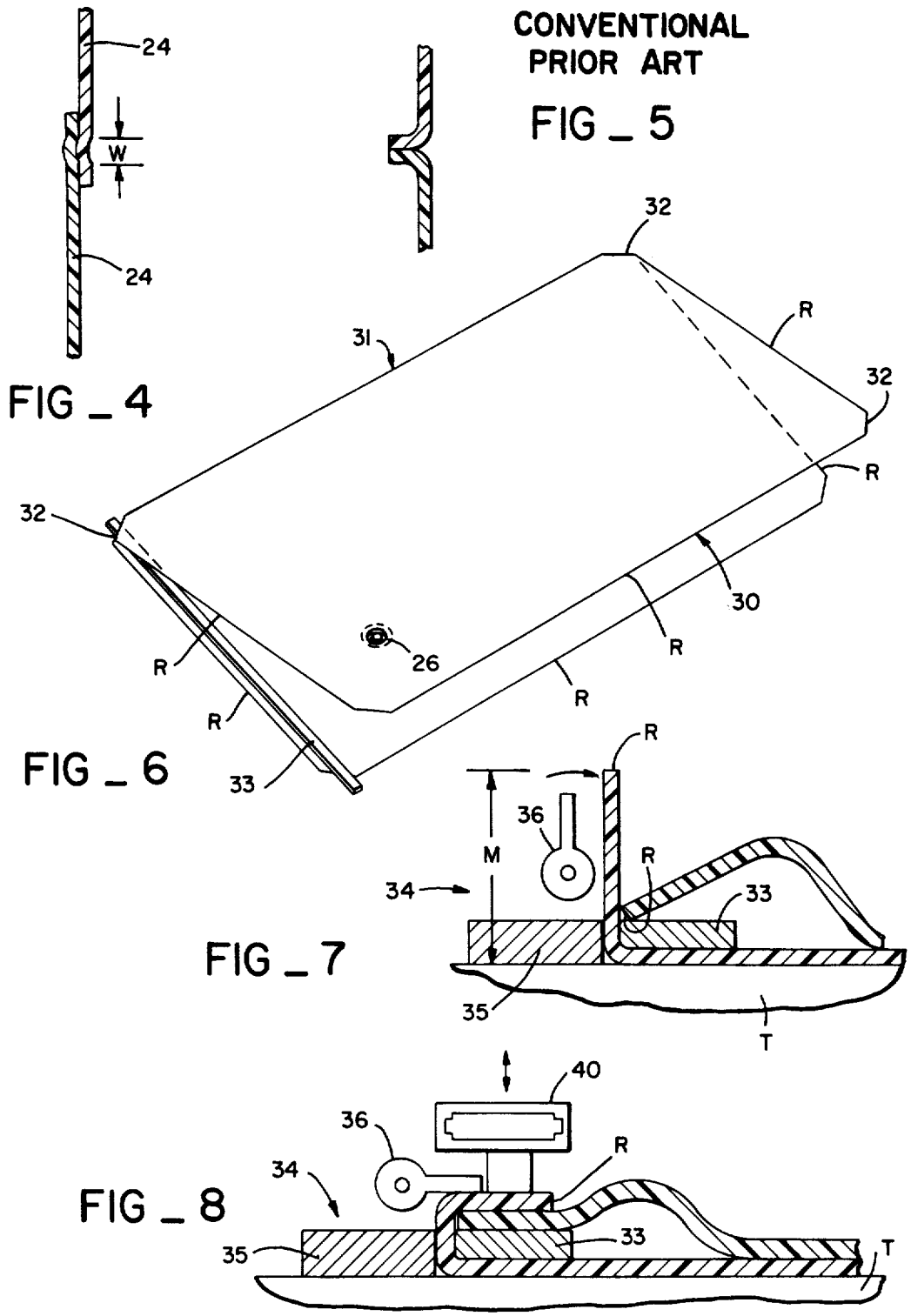

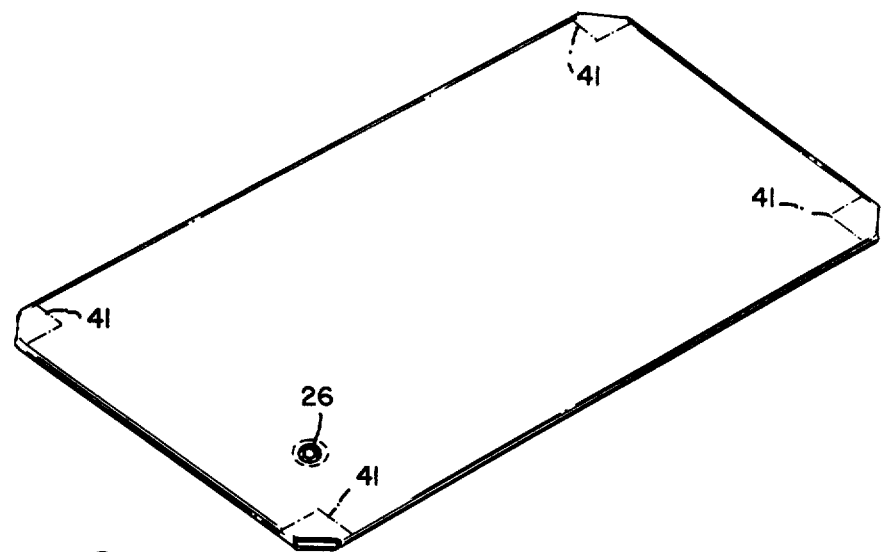
FIG _ 9
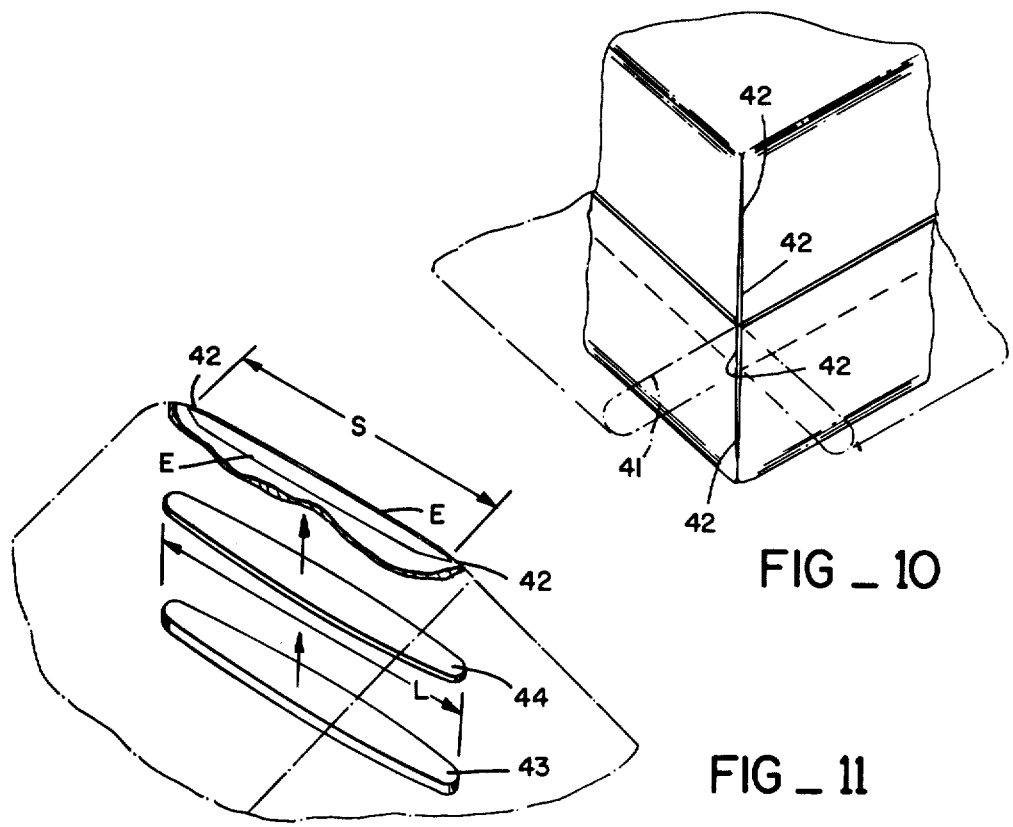
FIG _ 10
FIG _ 11

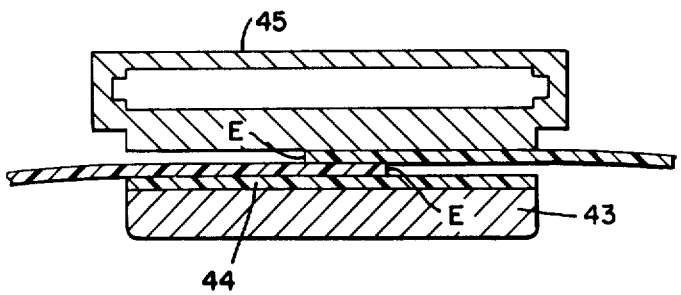
FIG_12
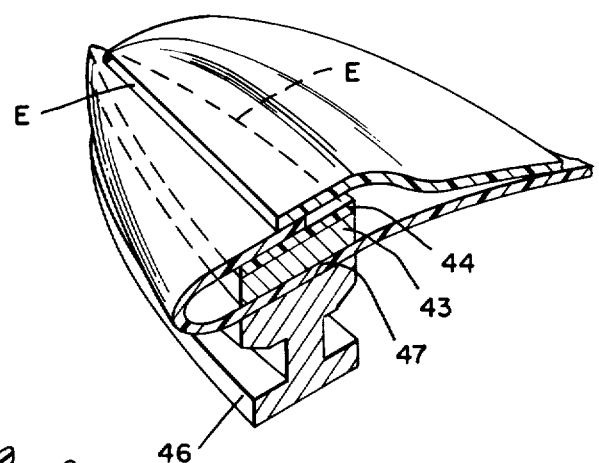
FIG_13
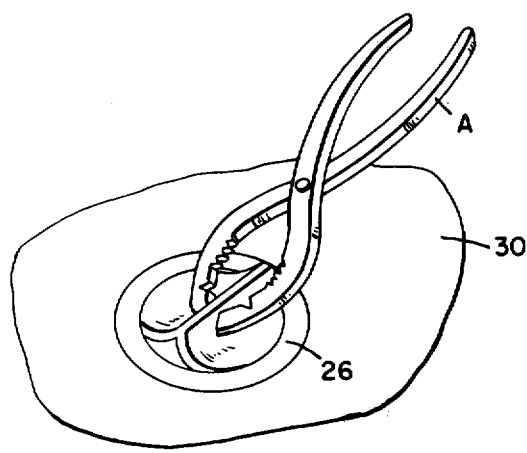
FIG_14
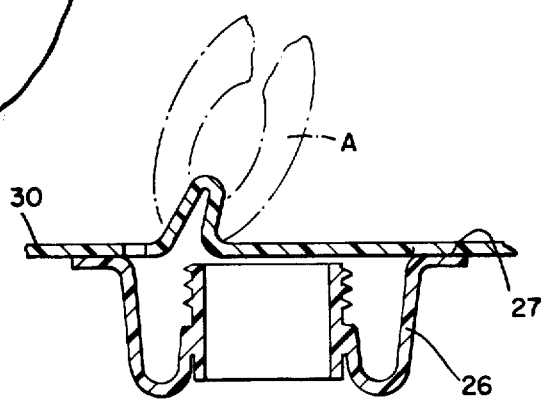
FIG_15

WATER MATTRESS AND METHOD OF MANUFACTURE

This is a division of Ser. No. 566,858, filed Apr. 10, 1975, now U.S. Pat. No. 3,957,557.

BACKGROUND OF THE INVENTION

Waterbeds have been accepted by the general public as being both serviceable and desirable. Further, they have been continuously improved since their introduction and generally employ a surrounding frame which supports the peripheral vertical edges of a rectangular envelope (mattress) which is filled with water. Such devices have been patented and typical patents on waterbeds include the air frame constructions, such as shown in U.S. Pat. No. 3,778,852 issued to Penn et al, or multiple compartment matresses such as shown in U.S. Pat. No. 3,766,579 issued to Shields. Further, highly desirable innovations may be incorporated in such water mattresses as illustrated in U.S. Pat. No. 3,864,768 issued to Fraige et al, which increases both comfort and conveniences of such water mattresses.

Since water mattresses contain a large amount of water creating substantial hydrostatic pressures within the mattress, which are increased when the mattress is in use, mattress construction is critical since they are normally manufactured of thin thermal plastic films, such as polyvinyl chloride, forming a box-like envelope that must contain the water without leakage. Thus, a number of techniques have been developed for the construction of water mattresses such as those illustrated in U.S. Pat. No. 3,753,823 issued to Kuss and U.S. Pat. No. 3,753,819 issued to Mollura. In addition, general construction techniques relating to thermal plastic film, such as polyvinyl chloride, are illustrated in U.S. Pat. No. 2,440,664 issued to Irons; U.S. Pat. No. 3,362,302 issued to Friedman; and U.S. Pat. No. 3,619,863 issued to Ciabani.

Even with all these known construction techniques a considerable number of problems still exist in obtaining a leak-proof box-like enclosure (water mattress) for waterbeds. Of course when an air frame construction is employed an additional separate leak-proof pneumatic enclosure must be fabricated about the basic enclosure causing additional problems in obtaining a quality waterbed.

The areas of persistent leakage in water mattresses are usually located in the seams and corners of the box-like envelope forming the water mattress. Obviously, because of the relatively high hydrostatic pressures when the mattress is in use, there is considerable strain on all the seams and, as a result, both structural failures and improper welding techniques can often cause water leakage problems, that first appear when the mattress is first put into service.

The current invention is related to a mattress which is manufactured by techniques wherein the water mattress includes improved seams and corner constructions that give the mattress increased service life and decrease the problems of leakage resulting from structural failure in such areas or from improper bonding.

Another collateral object of the instant invention is a technique for improving the installation of the filler valve through which water can be pumped to fill the water mattress and through which air is expelled from the interior of the mattress when the mattress is filled with water.

Other objects will be apparent from the description of the water mattress and the method of construction more specifically set out in detail herein.

SUMMARY OF THE INVENTION

An improved water mattress is made by a method of manufacturing a parallelepiped envelope mattress configuration which includes equipping a flat rectangular sheet of thermal plastic with an ingress/egress valve in an appropriate locus followed by folding the rectangular sheet on itself to form a smaller rectangle with overlapped top and bottom portions and thereafter the three resulting lapped raw edges of the smaller rectangle are separately sealed by the technique of placing the outside surface of one of such raw edges against the inside surface of its other raw edge to secure a parallel lapped relationship, and while holding such edges in such lapped relationship, simultaneously sealing the entire edge with a continuous single seam. After the remaining two of the three raw edges are sealed in a similar manner the corners of the resulting flat envelope are each notched with a rectangle of a prescribed size so that each corner may be sealed by the steps of separating the apexes of the notch followed by stretching the resulting slit over and elongated oval-shaped die having a length greater than the slit so that the edges of the slit are brought into an overlapping relationship whereby an additional reinforced piece of vinyl can be overlapped with the laps of the slit followed by a sealing operation which integrally bonds the reinforced strip and the two lapped edges of the slit into a strong serviceable corner. After the last corner is sealed by the aforedescribed technique, the oval-shaped die may be removed from the interior of the mattress by removing it through the aforedescribed valve.

BRIEF DESCRIPTION OF THE DRAWINGS

FIG. 1 is a perspective of the resulting parallelepiped water mattress construction obtained according to the teachings of this patent;

FIG. 2 is a broken-away corner of the completed water mattress illustrating one of the outside corners (away from the fold line) in enlarged detail;

FIG. 3 is a similar broken-away perspective of a corner of the completed water mattress, but illustrating an inside corner (contiguous to the fold line) of the water mattress in enlarged detail;

FIG. 4 is a section through one of the lapped seams of the subject water mattress illustrating its construction;

FIG. 5 is a similar section through a butt seam of the type often used in prior art construction of water mattresses especially at the corners thereof;

FIG. 6 illustrates in perspective how the vinyl sheet is first folded after the valve has been integrated therewith to form the overlapped rectangular constuction with the three raw (unsealed) edges;

FIG. 7 is a section through one of the resulting edges of the overlapped structure illustrated in FIG. 6 detailing a welding backing member of bar (electrode) and schematically a jig for holding the outside surface of one of the raw edges against the inside surface of its adjacent raw edge for forming the lap seam for each edge;

FIG. 8 is similar to FIG. 7 wherein the schematic jig is in the closed position and the head of the welding electrode has been urged against the backing member whereby the lapped edges of the raw edges can be simultaneously sealed along one entire side of the water mattress;

FIG. 9 illustrates in perspective the resulting structure after the three raw edges have been sealed in a lapped relationship with the broken lines indicating the notch which is then cut in each corner;

FIG. 10 is a broken-away corner section of the structure shown in FIG. 9 illustrating how the apexes of the notch (obtained by cutting away the material illustrated in FIG. 9 by broken lines) are separated to form the corner slit;

FIG. 11 illustrates in perspective the apexes in their separated relationship, a reinforcing thermal plastic backing member with the elongated or oval-shaped die by which the slit can be stretched to cause its edges to overlap with one another;

FIG. 12 illustrates in longitudinal section the multiple lapped relationship of a corner seam at the time the integral corner seam is formed held on a shoe or last;

FIG. 13 illustrates the same relationship as shown in FIG. 12 in perspective with a section transversely through the corner seam; and FIGS. 14 and 15 illustrate in perspective and section respectively how the filler valve is incorporated in the vinyl sheet prior to the time it is folded into the lapped relationship shown in FIG. 4.

DESCRIPTION OF THE PREFERRED EMBODIMENT

In describing this invention, reference will be made to a vinyl sheet, it being understood that when such reference is made it is intended to include all flexible sheet material which would be suitable for similar manipulations using chemical or other types of bonding such as heat welding. With reference to the vinyl sheet, it should be appreciated that vinyl and similar types of materials can be joined or bonded through the employment of electronic welding devices which are common in the industry. These devices obtain a bond through the generation of heat at the interface of the vinyl surfaces which are sandwiched between the electrodes when bonding occurs. Since such bonding devices are well known in the art, no further description thereof will be undertaken and it is understood herein that when bonding is described in the subsequent description it will refer to the type of bonding just described. However, with reference to the bonding operations herein described, it should be appreciated that some of the dies which are also used as electrodes are capacitive-coupled to one of the electrodes of the bonding machine. This is feasible since only one layer of vinyl is between the die and its cooperative electrode. Further, other types of bonding might be employed, such as chemical bonding, provided the necessary strengths are achieved.

In reference to the water mattress and the method for manufacturing it, it should be appreciated that the resulting water mattress 20 is of a parallelepiped construction having a top 21, a bottom 22, two ends 23, and two sides 24, the latter being formed by extending portions of the top and bottom. In addition, the water mattress includes four corners 25 which are specially constructed along with an ingress/egress valve 26. Further, it should be appreciated that since the construction of the mattress is formed from a rectangular vinyl sheet, which is not pre-cut for the corners but is folded in a lapped relationship as illustrated in FIG. 6, one of the sides 24 does not require a seam, as do its opposite side and the two ends.

More specifically, as can be seen in FIGS. 2 and 3, the corner constructions include an accentuated, elongated oval-shaped weld wherein additional strength and integrity can be obtained without sacrificing either the appearance or the utility of the resulting mattress.

For a better conception of the desired ends obtained through this invention, reference is made to FIGS. 4 and 5. In FIG. 4, a lap seam is shown which is utilized on the three raw edges resulting when the rectangular vinyl sheet is folded as illustrated in FIG. 6. It can be appreciated when viewing this section that the bond occurs across a width "W" longitudinally along the entire length of the seam and that the width of the seam can be increased if desired. This type of seam is superior to that shown in FIG. 5, which is a conventional butt seam, wherein the seam itself is subjected to tension trying to separate the seam while the lapped seam illustrated in FIG. 4 is principally subjected to shear forces. The instant invention has as one of its ultimate goals to obtain the type of seam construction shown in FIG. 4 for all the seams in the water mattress made according to the method described herein.

More specifically, the structure illustrated in FIG. 1 can be achieved with a vinyl sheet 30 in which a plastic filler or ingress/egress valve 26 has been incorporated. These are commercially available valves, 670 series purchased from Halkey-Roberts Corporation of Paramus, N.J. Generally, this is accomplished in accordance with the technique shown in FIGS. 14 and 15, while the sheet is still in its planar state (prior to folding) by merely bonding a valve 26 to the sheet in the approximate desired locus. In bonding the valve in the sheet no aperture is cut in the sheet prior to bonding the valve thereto. In fact, this technique of attaching the valve is believed to be distinct from techniques employed in the prior art, in that no alignment or similar difficulties in aligning the valve with an aperture will be experienced. The valve 26 is incorporated into the sheet by merely utilizing a circular electrode to bond the circular surface 27 of the valve that surrounds the aperture to the surface of the sheet and immediately after the bonding operation has been accomplished, and while the vinyl is still warm from the bonding operation, a pair of pliers "A" is employed to grip the vinyl within the circular confines of the bonded area and, after the vinyl is gripped with the pliers or like device, pressure is exerted whereby the vinyl separates cleanly around a periphery of the bond as illustrated in 15. Obviously the heat generated in the bonding operation immediately inside the resulting circular bond weakens the vinyl and causes it to part cleanly about the inner periphery of the bond. This should be accomplished by the aforedescribed process immediately after the valve 26 has been bonded in the vinyl sheet.

By referring to FIG. 6, it can be seen that the rectangular sheet 30 is folded transversely on itself into a smaller rectangle along fold line 31 so that the raw edges "R" of the overlapping portions of the sheet are aligned in a parallel relationship about three sides of the periphery of the smaller rectangle. As can be seen in FIG. 6, valve 26 has been already bonded in place and the lapped corners 32 of the smaller rectangle sheets snipped off in a diagonal manner or cut open to provide a small aperture for the sealing operations.

More specifically, the lapped-type seam according to the instant invention is best accomplished by using the jig arrangement shown in FIGS. 7 and 8. Utilizing the jig, the vinyl sheet after having been folded as shown in FIG. 6 to obtain the rectangular configuration, a process that is usually accomplished on a large table "T", a backing member or co-electrode 33 is placed parallel to one of the raw edges so that a measured elongated strip of vinyl is outboard of the backing member as illustrated in FIG. 6. This rectangular strip has a width of M and is wrapped angularly about the vertical face of the backing member when the latter is supported on a table so it can be pushed into the jig 34. By this process the vinyl sheet 30 outboard of the backing member is sandwiched between a stationary block 35 of the jig and the backing member 33, as best illustrated in section in FIG. 7. At this time, the remaining raw edge "R" is aligned so that it is in the apex of V of the angle formed by the top of the backing member and the upright portion of the vinyl sheet that has been sandwiched between the block 35 and backing member 33. This arrangement ensures proper and parallel alignment of both edges of the seam along their entire length.

As it is one of the objects of the instant invention to avoid the tedious job of aligning a pre-cut vinyl sheet as is required in the Kuss patent described above, it is important to maintain the rectangular character of the lapped sheet illustrated in FIG. 6. This is facilitated by the jig 34 and when the raw edges "R" to be sealed in the lapped seam are placed in the jig as described above, the keeper member 36 is rotated so that its projecting arm forces the portion of the vinyl sheet adjacent to the raw edges into a parallel lapped relationship, shown in FIG. 8. As can be seen in this lapped relationship, the inside surface of one of the raw edges is forced against the outside surface of the other raw edge along the entire length of the side of the sheet being bonded. Further, and jig ensures that the overlap is parallel and equal along the entire seam length. When the jig has retained the raw edges in the overlapped relationship described above, a welding electrode can be lowered onto the central portion of the lapped raw edges (shown in FIG. 8) and with an electrode having adequate length, the entire seam along one edge is completed with a simultaneous bonding operation to form a high-strength lapped seam. In prior art bonding, often the seam is completed in a series of overlapping bonds along each side. This is undesirable since the "overlap bonds" weaken the seams by "cooking out" the plasticizers in the vinyl. In addition, in the prior art where the length of the two parts of the seam was improper the bond was further complicated.

Obviously, the three open edges of the lapped vinyl sheet are sealed in exactly the same manner as described above and it should be appreciated that the backing member projects from the ends of the open corner portions as illustrated in FIG. 6 when the welding operation is in progress. This allows the backing member to removed after each edge seam has been completed.

After the three sides of the overlapped vinyl sheet have been sealed, a flat edge-sealed structure or envelope, as shown in FIG. 9, is achieved. Because of the use of the jig and the simultaneous bonding of the entire seam length on each edge when it is sealed, the flat envelope shown has maintained its rectangular character and has uniform edge seams. At this time the truncated corners are notched to a prescribed size indicated by broken lines 41. By notching the corners of the flat envelope at this stage in the manufacture of the water mattress, exact alignment of the corners can be achieved since the vinyl sheet has been confined to a prescribed overlapping enclosed envelope with the exception of the corners. This is an important feature of the instant method since no time is lost in attempting to align pre-cut corners or pre-cut sides after corners have been formed, as employed in the conventional manufacture of waterbeds.

After the corners have been notched to a prescribed size the apexes 42 of the lapped sheets are separated as shown in FIG. 10 as part of the first step in forming the corners. Each corner of the water mattress according to this invention is formed in the same manner and therefore only the techniques employed in one will be described in detail. The rectangular notch is cut in the corners of the sheets so that when the apexes are separated a distance "S" (see FIG. 11) they form a slit which can be slightly less than the total finished height of the water mattress. To fabricate each corner, a thin elongate or oval jig or backing member 43 is used. Its length "L" is greater than the slit length "S" formed when the apexes of the notched corners are separated as described above. This jig is placed inside the mattress with a reinforcing vinyl patch 44 having the same approximate shape and size as the face of the oval jig 43 added after the slit has been stretched. As this jig is brought into position, the slit at the corner is stretched over the ends of the jig causing the two raw edges "E" of the slit to come into an overlapping relationship, then the patch 44 can be incorporated into the lap on the inside or outside thereof. Basically, the configuration achieved is best shown in the section illustrated in FIG. 12 wherein the corner welding electrode 45 has been lowered against the vinyl surface to sandwich the reinforcing path 44 and the two lapped raw edges "E" between the electrode and the oval-shaped jig or die 43, the latter also serving as an electrode because it is capacitively coupled with the shoe or last. The reinforcing patch 44 ensures that a wide double lap will be achieved in the corners for additional strength. Through the stretching operation a small degree of lap, as illustrated, is obtained between the several raw edges "E" of the corner slit. Again, it should be appreciated that the resulting seam which is achieved is a lap rather than a butt seam and therefore is stronger than the more conventional butt-type seam, as illustrated in FIG. 5 where the seam is principally under tension rather than shear.

To facilitate the fabrication of the corner and also the stretching operation necessary to bring the raw edges "E" of the slit in the corners into overlapping operation, a shoe or last 46 is employed. This shoe or last, which serves as a co-electrode being capacitively coupled with the jig or die 43, has a platform 47 which is approximately the same size as the oval-shaped jig 43. Since the oval-shaped jig is employed on the inside of the mattress when the corner is sealed, it must be appreciated that there is a layer of the vinyl sheet between the oval-shaped jig and the platform 47 of the shoe or last, as best illustrated in FIG. 13 when the bonding is accomplished. In any case, through the utilization of the shoe or last and the internal jig, the corner slit is stretched a length slightly less than the length "L" to achieve the lapped relationship of the raw edges "E" illustrated in FIG. 13. As indicated, the platform length should be somewhat longer than the length of the slit which is stretched over the die; however, the slit can be longer, equal or shorter than the finished height of the mattress. The welding electrode 45 will generally have a bonding surface which is generally coextensive with the top surface configuration of jig 43. Again, when bonding is accomplished on a corner the entire corner seam is welded simultaneously in a double-lapped seam with a reinforcing backing member which is integrally bonded as a unit with the lapped edges "E" in a leak-proof corner seam best illustrated as corner 25 in FIGS. 2 and 3. In some cases the backing member can be eliminated but normally is inserted after the slit has been stretched and retained on the shoe by opening the slit and placing it on the face of jig or die and then closing the slit so the edges overlap.

After the last corner has been completed in the above manner, the elongated or oval-shaped jig 43 is worked to valve 26 inserted in a top panel of the completed water mattress and is extricated through the valve by a slight deformation of the valve allowing the jig to be slipped through its aperture.

In respect to the water mattress and its method of manufacture described according to this invention, it should be appreciated that it is not necessary to use large internal jigs and/or dies which serve as electrodes such as shown in the aforementioned Kuss patent or the aforementioned Mollura patent wherein large apertures must be left in the mattress to remove the jig once the mattress has been partially completed. To close such apertures a separate sealing/bonding step is required and obviously requires more total inches of seams to be present in the water mattress, which is undesirable.

What is claimed is:

1. A method of incorporating a heat sealable plastic valve with a radially extending flat flange for bonding to thermal plastics in a flat uperforated rectangular sheet of thermal plastic by heat sealing without the necessity of preforming an aperture in said sheet before said valve is joined with said sheet comprising:

placing a radially extending flat bonding surface of a pre-formed ingress-egress valve against one of the sides of a thermal plastic sheet, said surface having a central aperture therein;

applying heat to the interface of the bonding surface of said valve and a contiguous portion of the sheet in contact with said bonding surface sufficient to interbond said contiguous surfaces with one another; and subsequently, before said contiguous surfaces cool substantially, gripping a portion of the thermal plastic sheet surrounded by such central aperture of said valve and exerting sufficient force thereon to cause said portion to separate about the inner periphery of such aperture of said valve, thereby exposing its recessed aperture.

2. The method defined in claim 1 wherein the plastic ingress-egress valve has an annular bonding surface and a closeable recessed opening.

* * * * *